No. 792,536. PATENTED JUNE 13, 1905.
T. W. MORAN.
FLEXIBLE JOINT.
APPLICATION FILED JUNE 21, 1904.

Witnesses
R. A. Boswell
A. G. Graney

Inventor
T. W. Moran
By E. W. Anderson
his Attorney

No. 792,536. Patented June 13, 1905.

UNITED STATES PATENT OFFICE.

THOMAS W. MORAN, OF LOUISVILLE, KENTUCKY, ASSIGNOR TO MORAN FLEXIBLE JOINT COMPANY, OF LOUISVILLE, KENTUCKY, A CORPORATION OF KENTUCKY.

FLEXIBLE JOINT.

SPECIFICATION forming part of Letters Patent No. 792,536, dated June 13, 1905.

Application filed June 21, 1904. Serial No. 213,564.

*To all whom it may concern:*

Be it known that I, THOMAS W. MORAN, a citizen of the United States, and a resident of Louisville, in the county of Jefferson and State of Kentucky, have made a certain new and useful Invention in Flexible Joints; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1:
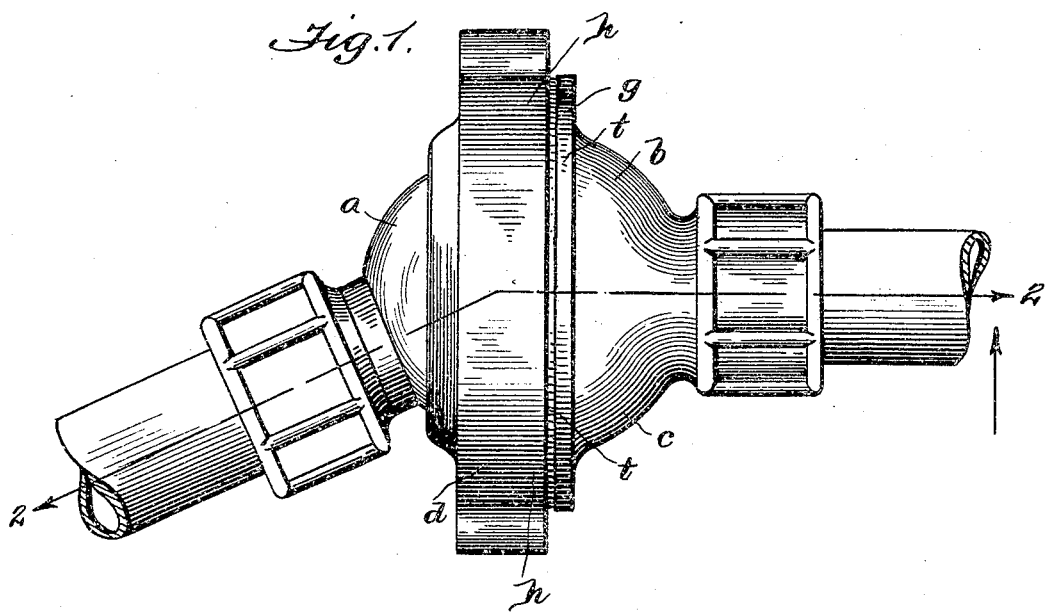
Figure 2:
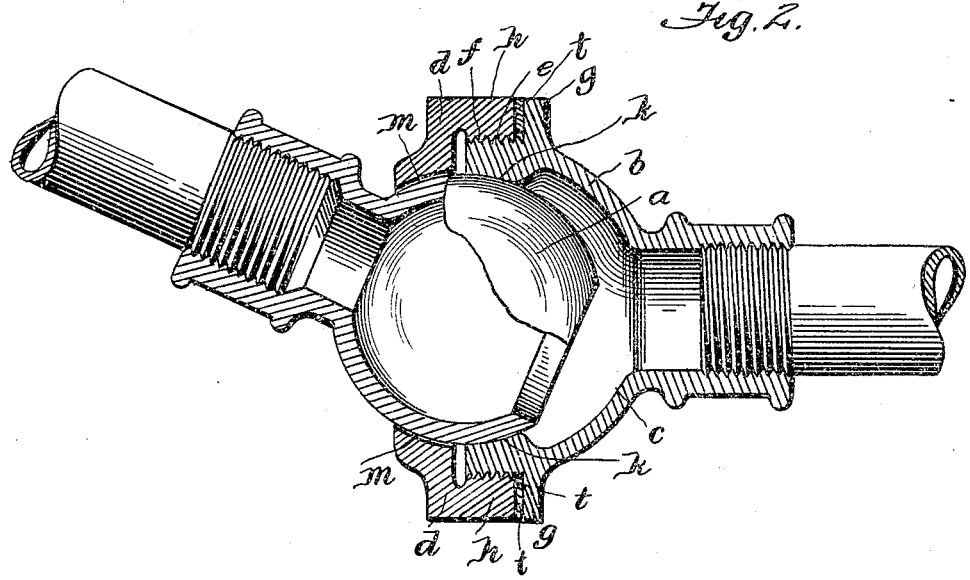

Figure 1 is a side view of the invention. Fig. 2 is a sectional view of the same on line 2 2 of Fig. 1.

This invention has relation to metallic flexible pipe-joints for steam and liquids; and the invention consists in the novel construction and combinations of parts, as hereinafter set forth.

In the accompanying drawings, illustrating the invention, the letter $a$ designates the hollow ball interior member of the joint, and $b$ the exterior member, composed of the chambered and outward-flanged cup portion $c$ and the downward-flanged ring portion $d$. The cup portion is provided with an exterior annular thread $e$ to engage the interior thread $f$ of the flange $h$ of the ring portion. The cup portion is also provided with the exterior shoulder $g$, extending outward from the base of its thread $e$ and adapted to engage the flange $h$ of the ring portion where the parts are screwed together. In this position the concave annular bearing-faces $k$ and $m$, respectively, of the cup portion and the ring portion, which are spherically ground on the radius of the ball, are concentric and engage the ball portion neatly, forming a close joint. Between the shoulder of the cup portion and the flange of the ring portion is located the thin annular ring $t$, which is designed to fit neatly said flange and shoulder, which close upon it when the parts are forcibly screwed together and form a steam-tight joint at this shoulder. The interposition of this annular bearing $t$, while rendering the shoulder-joint close, at the same time changes the relative position of the concave annular bearing-faces of the cup portion and ring portion slightly, so that they have an eccentric relation to each other and are in this manner designed to loosely engage the ball portion. The joint is thus rendered suitable for steam, the pressure of which will close the ring bearing on the ball; but when the pressure is relieved the joint will open automatically to allow the escape of the water of condensation.

Having described this invention, what I claim, and desire to secure by Letters Patent, is—

1. In a metallic flexible pipe-joint, the combination with a hollow ball member, of the threaded ring portion, and of the threaded and shouldered bell-bearing portion having their respective concave annular bearing-faces relatively centric to the ball member, and means for holding said ring portion and bell portion in relatively eccentric position while maintaining a close joint between the ring portion and bell-shoulder, substantially as specified.

2. In a metallic flexible pipe-joint, the combination with a hollow ball member, of a threaded ring portion, and a threaded and shouldered cup portion, having their respective concave annular bearing-faces spherically curved on the radius of the ball, and relatively adjustable from centric to eccentric position, and an annular bearing-plate between the cup portion and the ring portion adapted to hold said bearing-faces in eccentric relation to each other, substantially as specified.

In testimony whereof I affix my signature in presence of two witnesses.

THOS. W. MORAN.

Witnesses:
L. M. RENDER,
G. S. BRIDGES.